United States Patent [19]

Kennedy

[11] 4,301,132

[45] Nov. 17, 1981

[54] SILICON CARBIDE BODIES AND THEIR PRODUCTION

[75] Inventor: Peter Kennedy, Preston, England

[73] Assignee: United Kingdom Atomic Energy Authority, England

[21] Appl. No.: 143,757

[22] Filed: Apr. 25, 1980

[30] Foreign Application Priority Data

May 8, 1979 [GB] United Kingdom ............... 15832/79

[51] Int. Cl.³ ..................... C01B 31/36; C04B 35/52; C04B 35/71
[52] U.S. Cl. .................................... 423/345; 428/404; 501/90
[58] Field of Search ................... 423/346, 345; 106/43, 106/44; 428/404

[56] References Cited

U.S. PATENT DOCUMENTS 3,275,722 9/1966 Popper ........................... 423/346 X
3,495,939 2/1970 Forrest ............................. 423/346
4,019,913 4/1977 Weaver ............................. 423/346

Primary Examiner—Michael R. Lusignan
Attorney, Agent, or Firm—Larson and Taylor

[57] ABSTRACT

A reaction-sintered silicon carbide body having portions differing from each other in free silicon content and such a body with a surface layer rendered more readily abradable than the remainder of the body by the removal of free silicon from the surface layer. It has a particular application in the provision of shrouds for gas turbines, which can be produced by slip-casting in two stages.

9 Claims, No Drawings

SILICON CARBIDE BODIES AND THEIR PRODUCTION

BACKGROUND OF THE INVENTION

This invention relates to silicon carbide bodies and their production. It is particularly concerned with silicon carbide bodies (hereinafter referred to as "reaction-sintered silicon carbide bodies") produced by the reaction sintering of green bodies formed from a coherent mixture of silicon carbide and carbon, in the presence of molten silicon. This reaction sintering process is hereinafter referred to as "siliconising". The production of such bodies is described, for example, in U.S. Pat. Specification No. 3,495,939. They consist essentially of a substantially continuous matrix of silicon carbide particles bonded together and a substantially continuous free silicon phase.

SUMMARY OF THE INVENTION

One aspect of the present invention consists in a reaction-sintered silicon carbide body comprising a plurality of discrete portions differing from each other in free silicon content.

Another aspect of the present invention consists in a reaction-sintered silicon carbide body having a surface layer rendered more readily abraded than the remainder of the body by the removal of free silicon from the surface layer. This aspect of the invention finds a particular application in the production of tip shrouds for the rotor blades of gas turbine engines. It has been proposed that such shrouds should be provided with an inner surface which is readily abraded so that a rotor need not be matched to a particular shroud. Instead it can be used with any shroud and should wear its own track, establishing the necessary clearance.

The removal of free silicon from a surface layer is conveniently effected after siliconising by treatment of the surface layer with sodium hydroxide. To facilitate removal of free silicon in this way and for the residual surface layer to be readily abraded the surface layer should initially contain a relatively high proportion of free silicon, say 35% by volume, and a free silicon content up to about 50% by volume is desirable. This is to be contrasted with a preferred free silicon content of about 10% by volume for the reaction-sintered silicon carbide beneath the surface layer.

The proportion of free silicon to silicon carbide in reaction-sintered silicon carbide bodies depends in part on the proportions of carbon to silicon carbide in the coherent mixture forming the green body. (It also depends on the porosity of the green body). Thus in general, the lower the proportion of carbon the higher the proportion of free silicon after siliconising. Hence to provide a surface layer which is to be more readily abraded after free silicon removal a relatively low proportion of carbon is most suitable in the initial coherent mixture. Such a surface layer may be provided on a body formed otherwise from a coherent mixture having a much higher proportion of carbon.

The surface layer may be conveniently formed by slip-casting and in a preferred embodiment of the invention the remainder of the body is also formed by slip-casting, the body being siliconised as a whole.

DESCRIPTION OF PREFERRED EMBODIMENTS

The following are examples of methods of producing a silicon carbide body in accordance with the invention.

EXAMPLE 1

A mix containing carbon and silicon carbide powders in the ratio 0.25:1 is pressed at about 100 MN/m$^2$ to form a base portion of green density 1.97 g/cc. This is re-pressed in contact with a mix containing carbon and silicon carbide powders in the ratio 0.1:1 at the same pressure and a second portion of density of 1.73 g/cc. is formed as a layer or coating on the original base portion. On siliconsing the base material is converted to 90% dense silicon carbide containing 10% free silicon and the coating to 65% dense material containing 35% free silicon. If the siliconised component is then leached with sodium hydroxide solution at 100° C. the free silicon is removed from the coating but very little from the base material.

EXAMPLE 2

A slip containing carbon and silicon carbide powders in the ratio 0.4:1 is cast in a plaster mould to form a base portion of 'green' density 1.73 g/cc. A coating is then laid down upon the original component base using a slip containing carbon and silicon carbide powders in the ratio 0.1:1. On siliconsing the component the base material is converted to 90% dense silicon carbide containing 10% free silicon and the coating to 51% dense silicon carbide containing 49% free silicon. The free silicon may be removed from the coating as in Example 1.

EXAMPLE 3

A mix containing carbon and silicon carbide powders in the ratio 0.5:1 and sufficient plastic binder to provide 42% porosity in the fully-consolidated body on removal of the binder is formed into a cylindrical pellet. Such a pellet contains no unfilled porosity. A second mix containing carbon and silicon carbide powders in the ratio 0.3:1 and sufficient plastic binder to provide a similar amount of porosity in the fully consolidated body on removal of the binder, is formed into an annular pellet, with an inner diameter the same as the outer diameter of the first pellet. Again the pellet contains no unfilled porosity. The cylindrical pellet is inserted in the annular pellet and the composite billet extruded to yield a rod with a surface layer having a different density from the core material. Also, provided that the plasticities of the two mixes are matched, the ratio of the layer thickness to the core diameter is the same in the extrudate as in the original billet. On removing the binder and siliconising the extrudate the base portion is converted to 90% dense silicon carbide containing 10% free silicon and the coating to 80% dense silicon carbide containing 20% free silicon. The free silicon may be removed from the coating as in Example 1.

EXAMPLE 4

A mix containing carbon and silicon carbide powders in the ratio 0.25:1 (and a binder) is pressed at about 100 MN/m$^2$ to form a base portion of 'green' density, after removal of binder, of 1.97 g/cc. The base portion is 'green-machined' if necessary and is heated in air up to 300° C. to remove the binder. A coating is then laid down on the original pressed portion, or some feature is filled, using a slip containing carbon and silicon carbide in the ratio 0.2:1. On siliconsing the base material is converted to 90% dense silicon carbide containing 10% free silicon and the coating to 64% dense silicon carbide containing 36% free silicon. The free silicon may be removed from the coating as in Example 1.

As an alternative to forming the base portion by pressing it may be formed by extrusion e.g. as in Example 3, the binder being removed at least in part before application of the coating by slip-casting.

I claim:

1. A reaction-sintered silicon carbide body comprising a plurality of discrete portions differing from each other in free silicon content.

2. A reaction-sintered silicon carbide body having a surface layer rendered more readily abraded than the remainder of the body by the removal of free silicon from the surface layer prepared by the process of claim 1.

3. A gas turbine engine rotor blade tip shroud for the rotor blades of a gas turbine engine comprised of the reaction-sintered silicon carbide of claim 2.

4. A reaction-sintered silicon carbide body prepared by the process of claim 1 having a surface layer containing a substantially higher proportion of free silicon than the remainder of the body.

5. A reaction-sintered silicon carbide body according to claim 4 wherein the surface layer has a free silicon content of at least 35% by volume.

6. The production of a reaction-sintered silicon carbide body comprising the steps of compacting a first mix of carbon and silicon carbide to form a first portion, compacting a second mix of carbon and silicon carbide in contact with the first portion and in proportions differing from those of the first mix, to form a second portion and a green body comprising the first and second portions, and reaction-sintering the green body in the presence of molten silicon.

7. The production of a reaction-sintered silicon carbide body having a surface layer differing in free silicon content from the remainder of the body comprising the steps of forming a green body by slip-casting a coherent mixture of silicon carbide and carbon on a second coherent mixture of silicon carbide and carbon in proportions differing from the proportions of silicon carbide and carbon in the slip-cast, and reaction-sintering the green body in the presence of molten silicon.

8. The production of a reaction-sintered silicon carbide body as claimed in claim 7 wherein the second coherent mixture is formed by slip-casting.

9. The production of a reaction-sintered silicon carbide body as claimed in claim 7 or claim 8 including the further step of treating the body to remove free silicon from the surface layer.

* * * * *

UNITED STATES PATENT AND TRADEMARK OFFICE
CERTIFICATE OF CORRECTION

PATENT NO. : 4,301,132
DATED : November 17, 1981
INVENTOR(S) : KENNEDY, Peter

It is certified that error appears in the above—identified patent and that said Letters Patent is hereby corrected as shown below:

Claim 1, last line, after "content" insert --prepared by the process of claim 6--.

Claim 2, last line, change "1" to --9--.

Claim 4, line 2, change "1" to --6--.

Signed and Sealed this

Ninth Day of March 1982

[SEAL]

Attest:

GERALD J. MOSSINGHOFF

Attesting Officer — Commissioner of Patents and Trademarks